United States Patent
Hirukawa et al.

(10) Patent No.: US 8,935,969 B2
(45) Date of Patent: Jan. 20, 2015

(54) MANUALLY OPERABLE MECHANISM FOR VEHICLE

(75) Inventors: Masayuki Hirukawa, Wako (JP); Tetsuyoshi Kikuchi, Wako (JP); Masaya Ishiguro, Fuchu (JP)

(73) Assignee: Honda Motor Co., Ltd., Tokyo (JP)

( * ) Notice: Subject to any disclaimer, the term of this patent is extended or adjusted under 35 U.S.C. 154(b) by 744 days.

(21) Appl. No.: 13/119,563

(22) PCT Filed: Jul. 30, 2009

(86) PCT No.: PCT/JP2009/063551
§ 371 (c)(1),
(2), (4) Date: Mar. 17, 2011

(87) PCT Pub. No.: WO2010/032559
PCT Pub. Date: Mar. 25, 2010

(65) Prior Publication Data
US 2011/0167950 A1 Jul. 14, 2011

(30) Foreign Application Priority Data
Sep. 19, 2008 (JP) .................. 2008-241502

(51) Int. Cl.
*B62K 23/06* (2006.01)
*B60T 7/10* (2006.01)

(52) U.S. Cl.
CPC *B60T 7/104* (2013.01); *B62K 23/06* (2013.01)
USPC .......... 74/501.6; 74/489; 188/24.18

(58) Field of Classification Search
USPC .......... 74/489, 501.6, 502.2, 529; 188/24.11, 188/24.22, 344; 192/13 A IPC ...................... B60T 7/10; B62L 3/02
See application file for complete search history.

(56) References Cited

U.S. PATENT DOCUMENTS

| 4,667,785 A * | 5/1987 | Toyoda et al. ............. 192/13 A |
| 6,389,928 B1 * | 5/2002 | Kobayashi et al. ............. 74/536 |
| 2008/0196539 A1 | 8/2008 | Schmauder |

FOREIGN PATENT DOCUMENTS

| DE | 19510782 A1 * | 9/1996 | ............... B62L 3/06 |
| DE | 19744138 A1 | 4/1999 | |
| DE | 20105666 U1 | 6/2001 | |
| DE | 102005019567 A1 | 12/2005 | |
| DE | 102005039109 | 2/2007 | |

(Continued)

OTHER PUBLICATIONS

European Search Report application No. 09814404.1 dated Aug. 25, 2011.

*Primary Examiner* — Thomas Diaz
(74) *Attorney, Agent, or Firm* — Squire Patton Boggs (US) LLP (57) ABSTRACT

A manual operator for a vehicle, wherein the manual operator can be simply operated, has a good appearance, and allows a sufficient space for a manual operator for a parking brake. A first manual operator (13) pivotably mounted on a handlebar (11) has an output section (26) mounted so as to be pivotable about the center of a first support shaft (12). A second manual operator (15) has an input section (44) provided so as to be pivotable about a second support shaft (14) when pushed by the output section (26). The second manual operator (15) is a manual operator adapted for a vehicle parking brake and capable of setting the vehicle to a parked state.

9 Claims, 8 Drawing Sheets

(56) References Cited

FOREIGN PATENT DOCUMENTS

| | | |
|---|---|---|
| DE | 202007011726 U1 | 10/2007 |
| JP | 2000-326836 | 11/2000 |
| JP | 2001-063675 | 3/2001 |
| JP | 2004-276649 | 10/2004 |
| JP | 2005-001511 | 1/2005 |

* cited by examiner

MANUALLY OPERABLE MECHANISM FOR VEHICLE

TECHNICAL FIELD

The present invention relates to an improvement in a manually operable mechanism for a vehicle.

BACKGROUND ART

A parking lever disposed in the vicinity of a grip of a handlebar of a motorcycle is known from, for example, Patent Literature 1 and 2.

The parking lever disclosed in Patent Literature 1 is pivotably provided in the vicinity of a left grip of a handlebar of a motorcycle. The parking lever is connected via a parking lever cable to a parking brake mechanism provided in a rear wheel of the motorcycle. When the parking lever is in a non-operated position located away from the left grip, a parking brake is released. When the parking lever pivots to an operated position located along the length of the left grip, the parking brake mechanism is actuated to apply the parking brake. When a driver starts the vehicle with the parking lever in the operated position, he grips the left grip. By gripping the left grip, he identifies the parking lever located along the left grip and remembers to release the parking brake before starting the vehicle.

For releasing the parking brake, the driver must manually operate the parking lever for pivotal movement of the parking lever from the operated position to the non-operated position. However, he would undesirably spend a lot of time and effort on such a manual operation of the parking lever before starting the vehicle.

Patent Literature 2 discloses a parking lever vertically pivotable on a horizontal support shaft extending longitudinally of a vehicle, and an operational lever (a clutch lever) horizontally pivotable on a vertical support shaft. The parking lever is disposed between the operational lever and a handlebar. When the operational lever is horizontally pivoted on the vertical support shaft towards the handlebar, a distal end portion of the operational lever presses a releasing portion of the parking lever to cause vertical pivotal movement of the parking lever on the horizontal support shaft for releasing a parking brake. That is, the operational lever and the parking lever are designed to provide a specific structure for converting a force causing the horizontal pivotal movement of the operational lever into a force causing the vertical pivotal movement of the parking lever.

The provision of such a specific structure undesirably results in an increased cost of components of the operational lever and the parking lever. Furthermore, the conversion of the force causing the horizontal pivotal movement of the operational lever into the force causing the vertical pivotal movement of the parking lever may not be smoothly made.

In addition, since the parking lever is disposed on the operational lever, the vertical pivotal movement of the parking lever provides unpleasant appearance. To make the appearance of the parking lever inconspicuous, one may propose downsizing the parking lever. However, operation of the downsized parking lever requires a great force.

There is a need to provide a mechanism for a parking brake of a vehicle, which mechanism includes a simple structure that can be operated in a short time in such a manner as to achieve smooth force conversion.

PRIOR ART LITERATURE

Patent Literature

Patent Literature 1: Japanese Patent Application Laid-Open Publication No. 2001-63675
Patent Literature 2: Japanese Patent Application Laid-Open Publication No. 2004-279649

SUMMARY OF INVENTION

It is therefore an object of the present invention to provide a mechanism for a parking brake of a vehicle, which mechanism includes a simple structure that can be operated in a short time in such a manner as to achieve smooth force conversion.

According to an aspect of the present invention, there is provided a manually operable mechanism for a vehicle having a handlebar to be operated by an operator for steering the vehicle, which mechanism comprises: a first manual operation member pivotably attached to the handlebar through a first support shaft, the first manual operation member being operable by the operator to pivot on the first support shaft; a second manual operation member pivotably attached to the handlebar through a second support shaft disposed in the vicinity of and in parallel to the first support shaft; and the first manual operation member having an output portion, the second manual operation member having an input portion to be pressed by the output portion of the first operation member during pivotal movement of the first manual operation member on the first support shaft such that the second manual operation member pivots on the second support shaft.

In a preferred form of the invention, the second manual operation member is pivotable between an operated position and a non-operated position, and wherein, when the second manual operation member is in the operated position, the second manual operation member is urged by a predetermined urging force in a direction opposite to a direction toward the non-operated position, and when the second manual operation member pivots towards the non-operated position through a given angle, the second manual operation member is urged by the urging force in the direction toward the non-operated position.

Preferably, the first manual operation member, the second manual operation member and the second support shaft are disposed such that, when the first manual operation member pivots against the urging force through an angle smaller than a predetermined angle, the second manual operation member is pivoted by the output portion of the first manual operation member pressing the input portion of the second manual operation member, and when the first manual operation member pivots through an angle larger than the predetermined angle, the second manual operation member is pivoted by the urging force urging the second manual operation member in the direction toward the non-operated position and the input portion of the second manual operation member moves away from the output portion of the first manual operation member so as to allow the second manual operation member to pivot independently of the first manual operation member.

In a further preferred form of the invention, the second manual operation member comprises a parking brake operated to hold the vehicle in a parked state.

The first manual operation member has the output portion formed integrally therewith and the second manual operation member has the input portion formed integrally therewith. The input portion is pressed by the output portion during the pivotal movement of the first manual operation member on the first manual support shaft such that the second manual operation member pivots on the second support shaft. Since operation of the first manual operation member moves the second manual operation member, the parking brake can be readily released.

When the first manual operation member is pivoted through the angle larger than the predetermined angle, the second manual operation member is urged by the urging force in such a direction as to release the parking brake and the input portion moves away from the output portion so as to allow the second manual operation member to pivot independently of the first manual operation member. After the second manual operation member is pivoted independently of the first manual operation member, the first manual operation member is pivotable independently, which is useful for an operator.

The size of the second manual operation member may be freely set. Thus, the second manual operation member may have a large size.

Preferably, the first manual operation member, the first support shaft and the second support shaft are disposed forward of the handlebar when the vehicle is viewed in top plan, and wherein, when a parking brake is released, the second manual operation member is located rearward of a front edge of the first manual operation member and forward of a rear edge of the handlebar in such a manner that a distal end of the second manual operation member does not interfere with a range of movement of an operational portion of the first manual operation member.

When the parking brake is released, the distal end portion of the second manual operation member is located without interfering with the range of the movement of the operational portion of the first manual operation member. It becomes possible to prevent the operator from unintentionally operating the second manual operation member when he operates the first manual operation member. That is, the operator may easily operate the first manual operation member because he is not subject to constraints attributed to the second manual operation member in operating the first manual operation member. The second manual operation member is disposed rearward of the front edge of the first manual operation member and forward of the rear edge of the handlebar, which makes the second manual operation member inconspicuous for improved appearance of the second manual operation member.

In a preferred form of the invention, the second manual operation member is pivotable between an operated position to apply a parking brake and a non-operated position to release the parking brake, and wherein the output portion of the first manual operation member and the input portion of the second manual operation member are disposed in such a manner as to prevent the second manual operation member from pivoting to the operated position when the first manual operation member is operated by a maximum amount.

In other words, it becomes possible to prevent the second manual operation member from pivoting to the operated position during operation of the first manual operation member.

In a further preferred form of the invention, the output portion of the first manual operation member provides a first turning radius defined as a distance between the output portion and the first support shaft, and the input portion of the second manual operation member provides a second turning radius defined as a distance between the input portion and the second support shaft, the first radius being larger than the second radius.

A small amount of the pivotal movement of the first manual operation member makes a large amount of the pivotal movement of the second manual operation member.

In a still further preferred form of the invention, the second manual operation member is disposed in such a manner as to pivot on the second support shaft within a range that does not extend rearward beyond a rear face of an auxiliary member attached to the handlebar when the vehicle is viewed in top plan.

The second manual operation member thus arranged does not provide an obstruction to the operator.

DESCRIPTION OF EMBODIMENTS

Certain preferred embodiments will be discussed below with reference to the accompanying drawings.

Figure 1:
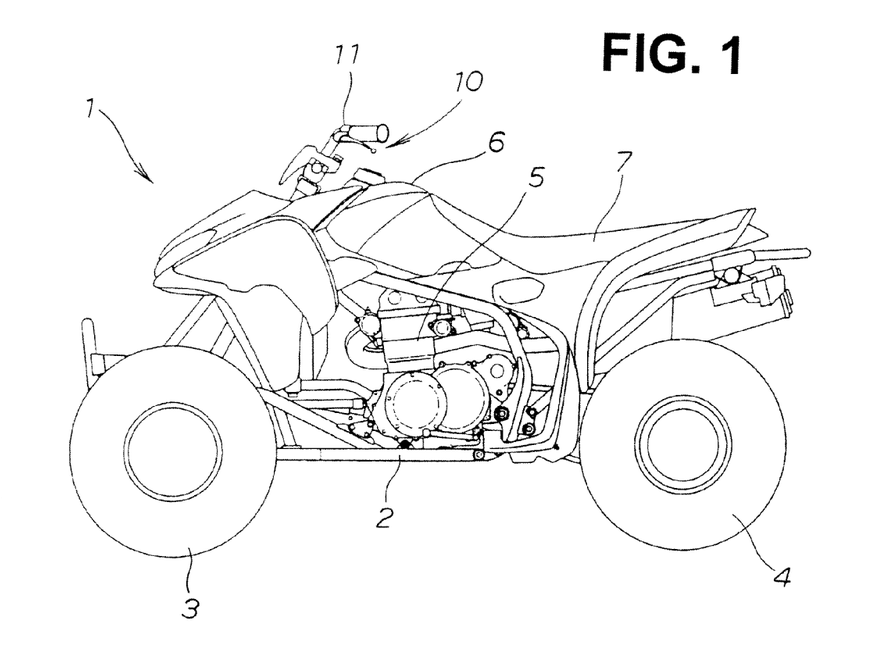
FIG. 1 is a side view showing a vehicle including a manually operable mechanism in accordance with the present invention.

Referring to FIG. 1, there is shown a straddle-type vehicle (or motorcycle) 1 arranged such that a driver sits on a seat 7 of the vehicle 1 with his legs positioned astride of the seat 7. The vehicle 1 includes a vehicle body frame 2, a front wheel 3 positioned forward of the frame 2 and a rear wheel 4 positioned rearward of the frame 2. Attached to the center of the frame 2 is an engine 5. Disposed above the engine 5 are a fuel tank 6 and the seat positioned rearward of the fuel tank 6. Located forward of the fuel tank 6 are a handlebar 11 to be operated by a driver for controlling the front wheel 3 to steer the vehicle 1, and a manually operable mechanism 10 provided on the handlebar 11 in accordance with the present invention. It is to be noted that the vehicle 1 is not be limited to the motorcycle and may be three-wheeled or four-wheeled straddle-type vehicle.

The manually operable mechanism 10 includes a first manual lever (a first manual operation member) 13 pivotably attached to the handlebar 11 through a first support shaft 12 such that the first manual lever is pivoted by the driver on the first support shaft 12, and a second manual lever (a second manual operation member) 15 attached to the handlebar 11 through a second support shaft 14 in such a manner as to pivot on the second support shaft 14. The second support shaft is disposed in the vicinity of the first support shaft 12.

Figure 2:
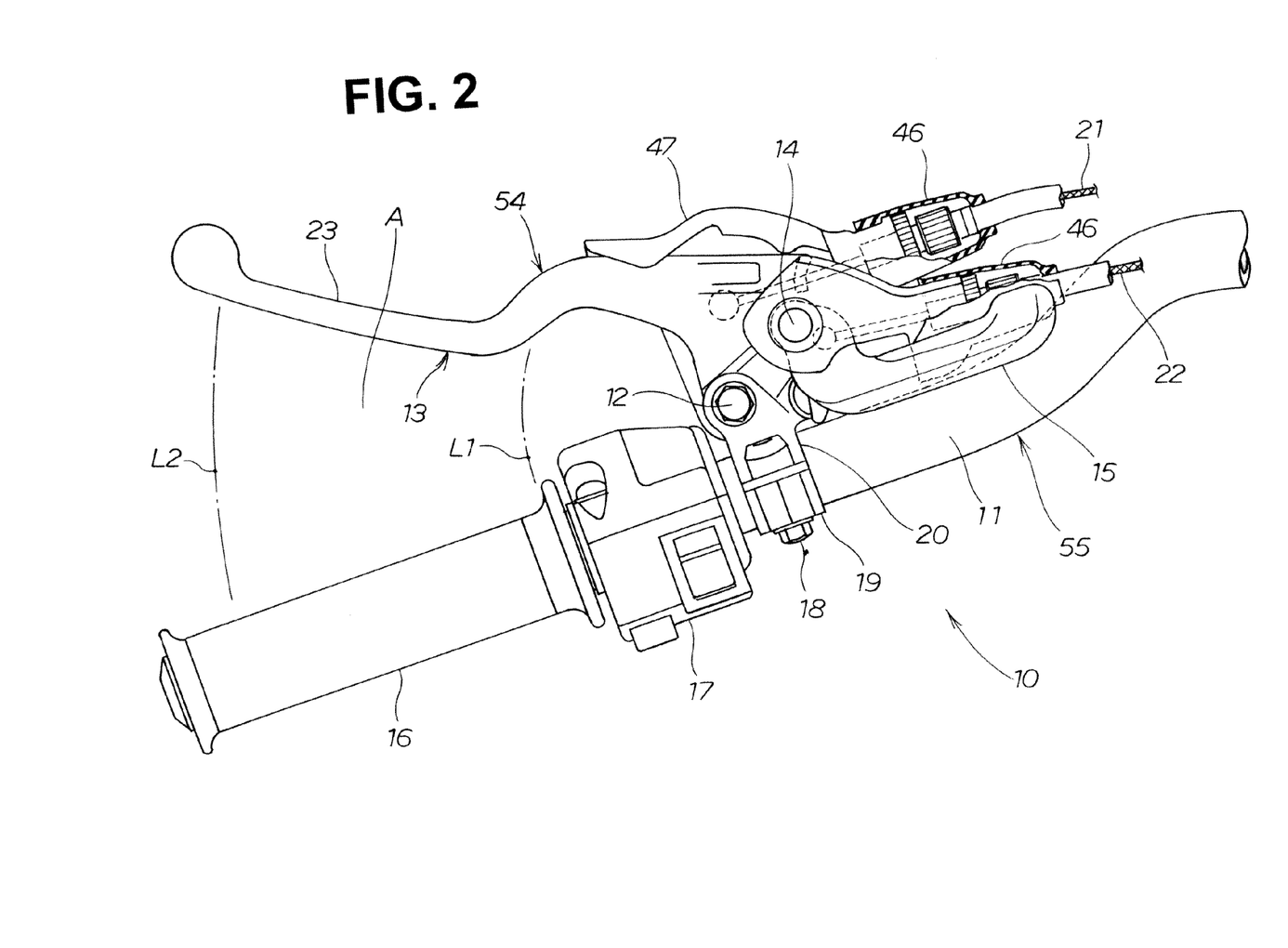
FIG. 2 is a top plan view of the manually operable mechanism shown in FIG. 1.

The handlebar 11 has a left grip 16. A left switch box (an ancillary member) 17 is attached to a vicinity of the left grip 16. A support member 20 for the manually operable mechanism 10 is attached to a vicinity of the left switch box 17, and carries a bolt 18 and a U-shaped fitting 19. The first manual lever 13 is attached to the support member 20 by the first support shaft 12. Connected to the first manual lever 13 is a clutch wire or brake wire 21. The second manual lever 15 is attached to the support member 20 by the second support shaft 14. Connected to the second manual lever 15 is a parking brake wire 22.

The first manual lever 13 includes an operational portion 23 to be operated or gripped by the driver. Since the first manual lever 13 is pivotable on the first support shaft 12, the operational portion 23 is movable within a region A defined by phantom lines L1, L2. The second manual lever 15 shown in FIG. 2 is in a position where a parking brake is released. When the second manual lever 15 is in such a position, the second manual lever 15 does not interfere with the region A. This means that the driver does not unintentionally operate the second manual lever 15 when he operates the first manual lever 13. The driver can more freely operate the first manual lever 13 because he is not subject to constraints attributed to the second manual lever 15 in operating the first manual lever 13.

Figure 3:
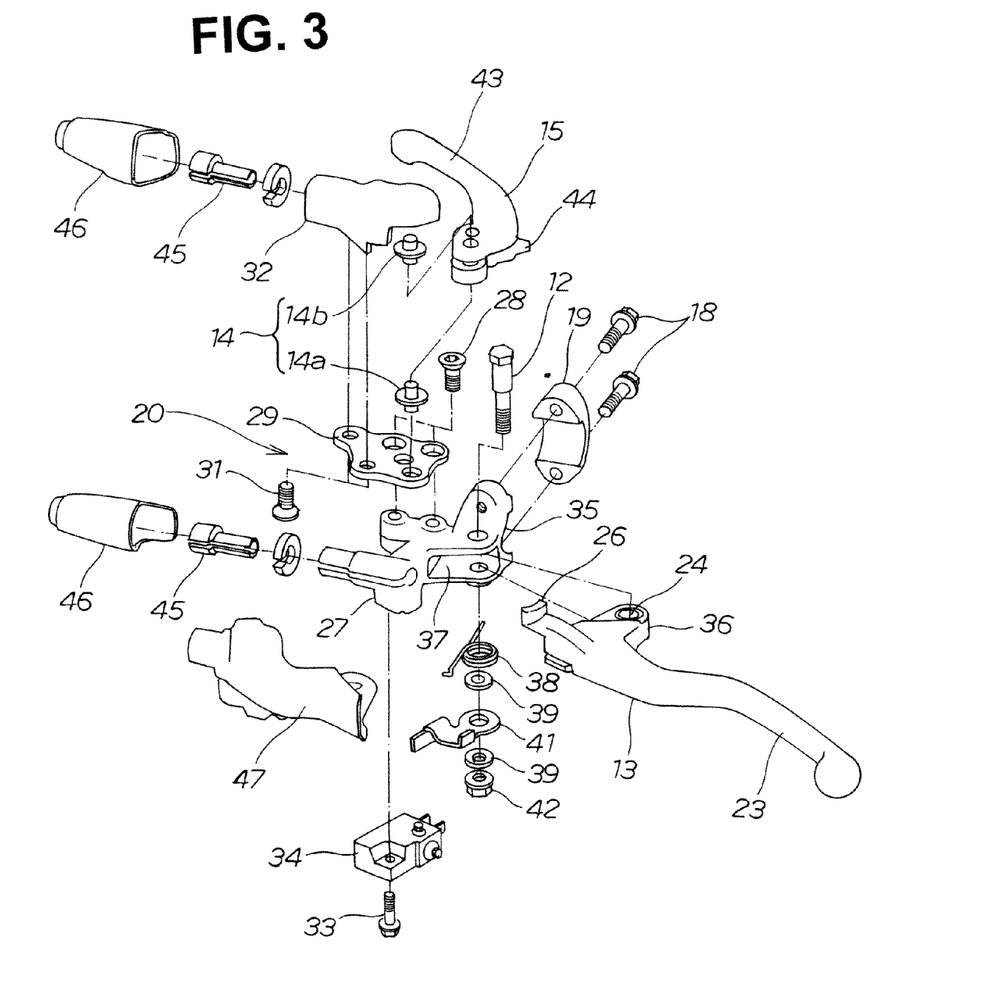
FIG. 3 is an exploded perspective view showing the manually operable mechanism shown in FIG. 2.

As shown in FIG. 3, the first manual lever 13 includes a flange portion 36 having a hole 24 for allowing the first support shaft 12 to pass through the hole 24. The first manual lever 13 further includes an output portion 26 formed integrally with and positioned oppositely from the operational portion 23. The output portion 26 is preferably in the form of a projection but may take a variety of configurations.

The support member 20 for the manually operable mechanism 10 includes a body 27, a lower bracket 29 attached to the body 27 by a screw 28, and an upper bracket 32 attached to the body 27 by a screw 31. A switch case 34 may be attached to a lower surface of the body 27 by a bolt 33.

The body 27 of the support member 20 includes a recessed portion 35 for allowing the handlebar 11 to be fitted in the recessed portion 35, and a pocket portion 37 for receiving the flange portion 36 of the first manual lever 13.

The flange portion 36 of the first manual lever 13 is inserted within the pocket portion 37 of the body 27 and the first support shaft 12 is inserted through the pocket portion 37 and the flange portion 36, with a torsion spring 38, washers 39, a stopper plate 41 and a nut 42 tightened onto a lower part of the first support shaft 12. With this arrangement, the first manual lever 13 is pivotably attached to the body 27 of the support member 20.

The second support shaft 14 includes a lower pin 14a and an upper pin 14b. The second manual lever 15 is pivotably attached to the lower bracket 29 by the lower pin 14a and to the upper bracket 32 by the upper pin 14b. The second manual lever 15 includes an operational portion 43 and an input portion 44 integral with the operational portion 43. The input portion 44 is preferably in the form of a projection but may take a variety of configurations.

Attached to the upper bracket 32 is a hollow wire connecting member 45 covered with a resin cover 46. Similarly, another hollow wire connecting member 45 is attached to the body 27 of the support member 20 and covered with a resin cover 46. The body of the support member 20 has a front face covered with a cover 47.

Figure 4:
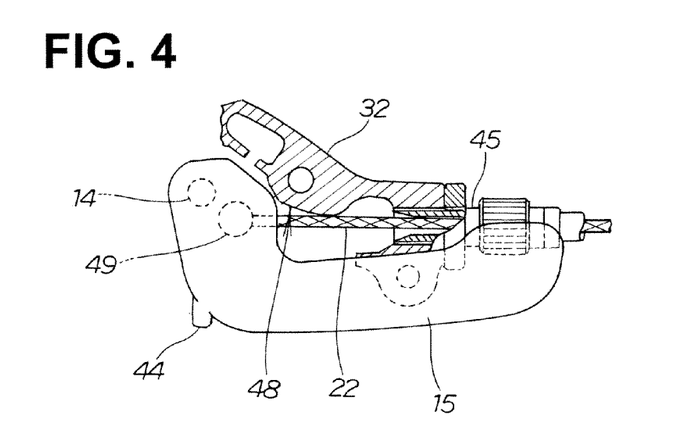
FIG. 4 is a view showing a relation between a second manual operation member and an upper bracket.

As shown in FIG. 4, the upper bracket 32 includes a curved surface 48 for guiding the parking brake wire 22. The parking brake wire 22 is connected through an end ball 49 to a portion of the second manual lever 15, which portion is located in the vicinity of the second support shaft 14. The parking brake wire 22 shown in FIG. 4 is in a position where a parking brake (not shown) is released. The parking brake wire 22 in such a position is not in contact with the curved surface 48 of the upper bracket 32. The parking brake wire 22 shown in FIG. 4 is urged by a spring (not shown) in such a direction (the right direction of FIG. 4) as to release the parking brake. With the parking brake wire 22 thus urged, the second manual lever 15 is urged in such a manner as to pivot counterclockwise on the second support shaft 14.

Figure 5:
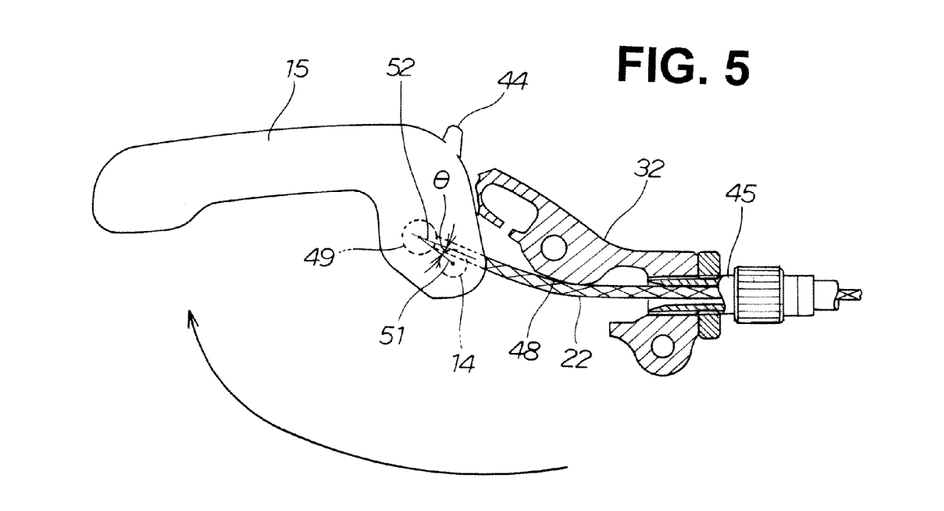
FIG. 5 is the view of FIG. 4 with the second manual operation member pivoted to an operated position to apply a parking brake.

As shown in FIG. 5, a line 51 passing through the center of the second support shaft 14 and the center of the end ball 49 and a centerline (an axial line) 52 of the parking brake wire 22 define an angle θ therebetween.

When the second manual lever 15 is pivoted by a driver's hand in a clockwise direction on the second support shaft 14, the end ball 49 is shifted upward to a position above the second support shaft 14. With the end ball 49 positioned above the second support shaft 14, the angle θ is "plus" (or θ>0). When the angle θ is "plus", the second manual lever 15 is urged by the parking brake wire 22 in such a manner as to pivot clockwise on the second support shaft 14. During the clockwise pivotal movement of the second manual lever 15, the parking brake wire 22 is guided by the curved surface 48 to thereby prevent the parking brake wire 22 from making tight contact with an exit of the hollow wire connecting member 45. This can result in extended life of the parking brake wire 22.

When the end ball 49 is positioned below the second support shaft 14, the angle θ is "minus" (or θ<0). That is, as the second manual lever 15 is pivoted counterclockwise from the position shown in FIG. 5, the end ball 49 is shifted downward to a position below the second support shaft 14 to thereby change the angle θ from "plus" through "zero" to "minus". With the angle θ being "minus", the second manual lever 15 is urged by the parking brake wire 22 in such a manner as to pivot counterclockwise on the second support shaft 14. Therefore, whether the second manual lever 15 is urged by the parking brake wire 22 to pivot clockwise or counterclockwise depends upon whether the angle θ is "plus" or "minus".

Discussion will be made as to how the manually operable mechanism 10 operates with reference to FIG. 6 to FIG. 8.

Figure 6:
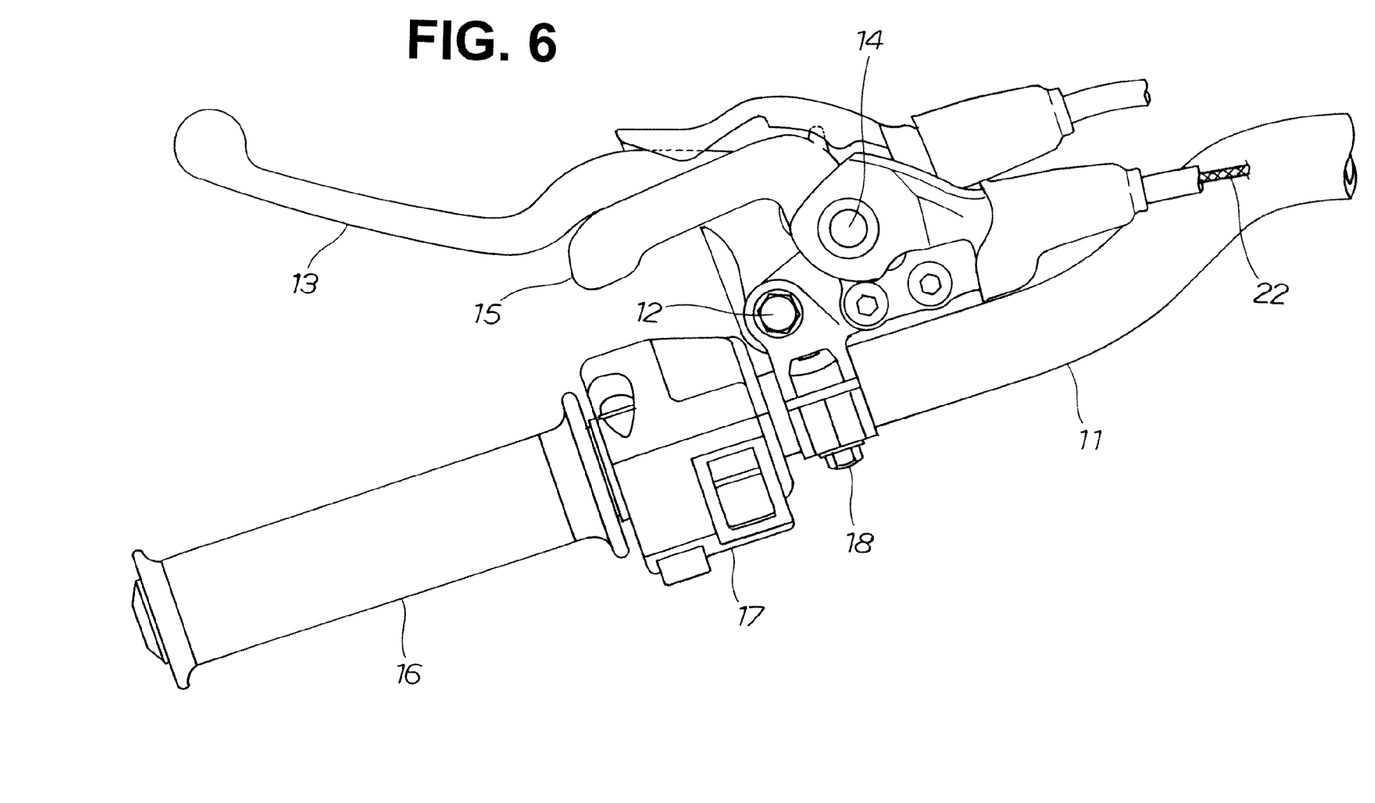
FIG. 6 is a view showing the second manual operation member in the operated position.

Referring to FIG. 6, the second manual lever 15 is shown pulling the parking brake wire 22 with the parking brake held in an applied position.

Figure 7:
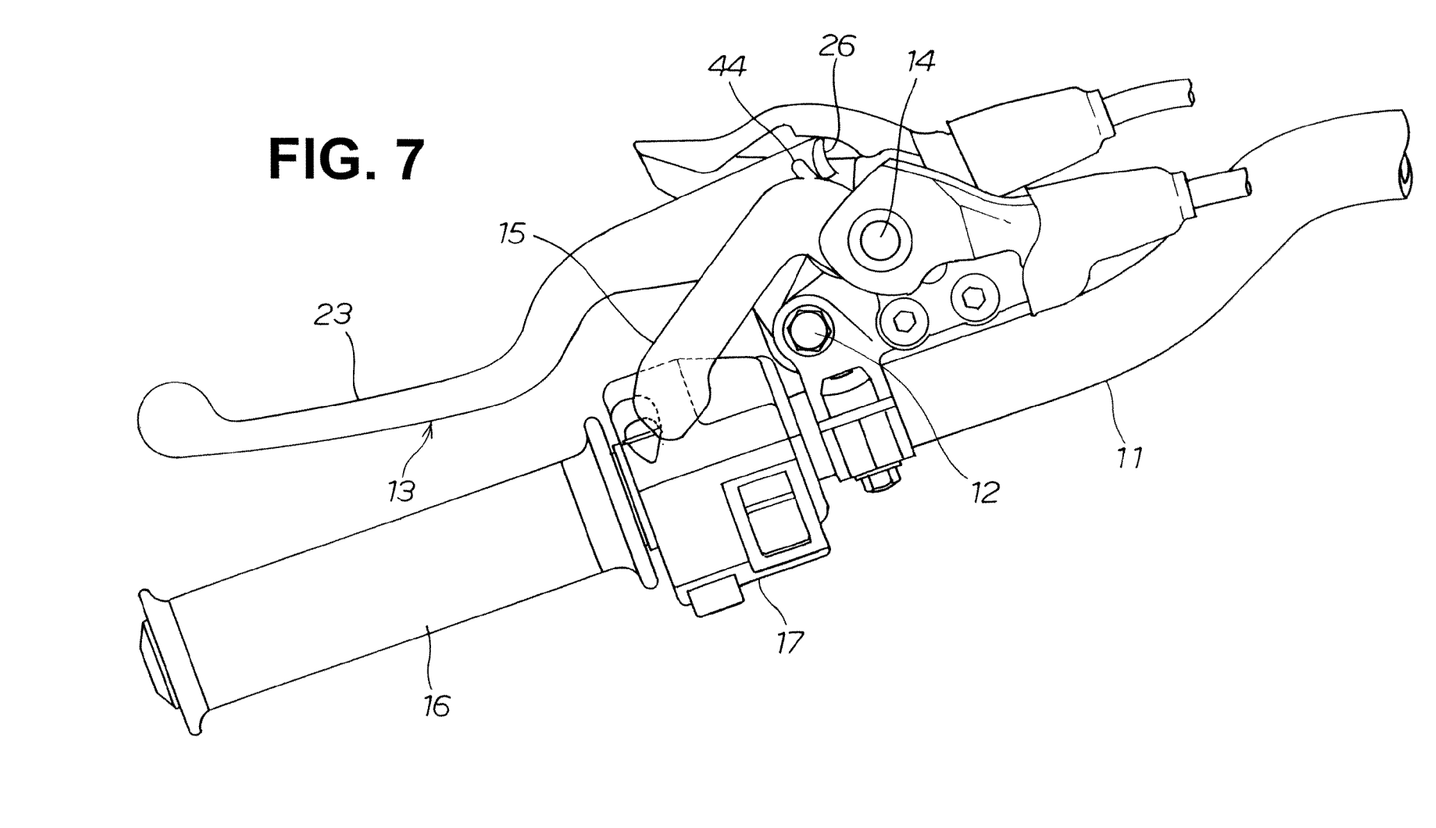
FIG. 7 is a view showing a first manual operation member pivoted in such a direction as to move the second manual operation member to a non-operated position to release the parking brake.

As shown in FIG. 7, when the driver operates the operational portion 23 of the first manual lever 13 to cause the first manual lever 13 to pivot on the first support shaft 12 counterclockwise through an angle smaller than a predetermined angle, the output portion 26 of the first manual lever 13 comes into abutment on and presses the input portion 44 of the second manual lever 15. By the output portion 26 pressing the input portion 44, the second manual lever 15 is pivoted counterclockwise on the second support shaft 14 against an urging force of the parking brake wire 22.

When the first manual lever 13 is further pivoted counterclockwise through the predetermined angle with the output portion 26 pressing the input portion 44, the second manual lever 15 is further pivoted counterclockwise. At this point, the angle θ is changed from "plus" to "zero".

Figure 8:
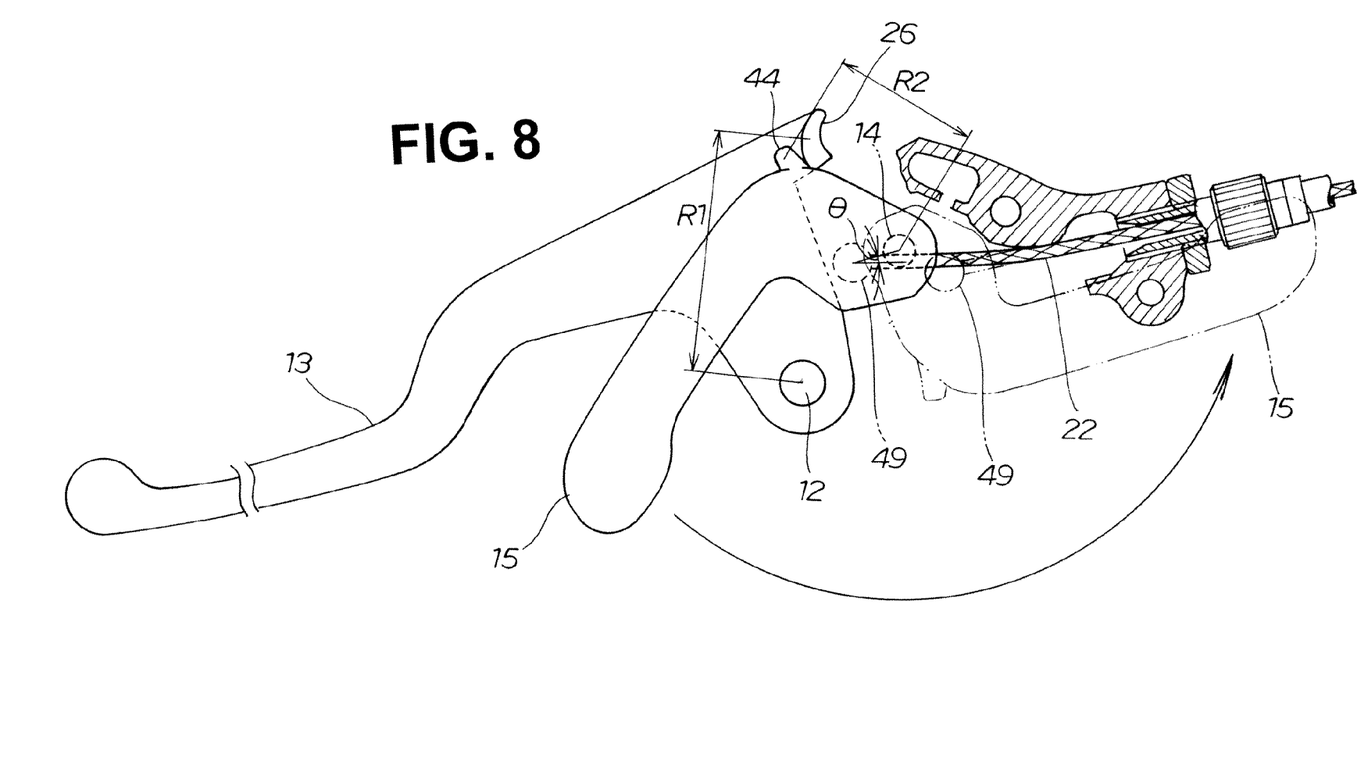
FIG. 8 is a view showing the first manual operation member pressing the second manual operation member in a direction towards the non-operated position.

As shown in FIG. 8, when the first manual lever 13 is further pivoted counterclockwise through an angle greater than the predetermined angle, the second manual lever 15 is further pivoted counterclockwise. At this point, the angle θ is changed from "zero" to "minus". With the angle θ being "minus", the input portion 44 moves away from the output portion 26 and the second manual lever 15 is pivoted counterclockwise toward a position (shown by a phantom line) by the urging force of the parking brake wire 22, as indicated by an arrow. When the second manual lever 15 is pivoted counterclockwise to the position shown by the phantom line, the parking brake is released for allowing the vehicle 1 to travel.

As can be seen from the foregoing descriptions made with reference to FIG. 6 to FIG. 8, when the first manual lever 13 is pivoted through an angle smaller than the predetermined angle, the output portion 26 of the first manual lever 13 presses the input portion 44 of the second manual lever 15 to thereby cause the second manual lever 15 to pivot in such a direction as to release the parking brake. When the first manual lever 13 is pivoted through an angle larger than the predetermined angle, the second manual lever 15 is pivoted by the urging force of the parking brake wire 22 in such a direction as to release the parking brake and the input portion 44 of the second manual lever 15 moves away from the output portion 26 of the first manual lever 13 so as to allow the second manual lever 15 to pivot independently of the first manual lever 13. After the second manual lever 15 pivots independently of the first manual lever 13, the first manual lever 13 is pivotable independently, which is easier-to-use for the driver.

Since the first manual lever 13 includes the output portion 26 for pressing the input portion 44 of the output portion 26, it becomes possible to operate the second manual lever by operating the first manual lever, which provides an easy operation of releasing the parking brake.

When the first manual lever 13 is fully gripped by the driver's left hand to further pivot counterclockwise from the position shown in FIG. 8 and the second manual lever 15 is pivoted by the driver's right hand clockwise from the position shown by the phantom line of FIG. 8, the output portion 26 of the first manual lever 13 serves as a stopper and limits movement of the input portion 44 of the second manual lever 15. As a result, the second manual lever 15, which has been pivoted clockwise, automatically pivots back to the position shown by the phantom line of FIG. 8. That is, when the first manual lever 13 is counterclockwise pivoted by the maximum amount or more than a predetermined amount, the second manual lever 15 can not be pivoted clockwise to a position where the parking brake is applied. This arrangement prevents the vehicle 1 from starting to travel with the parking brake applied.

The output portion 26 of the first manual lever 13 moves in a curve or arc of a first radius (first turning radius) R1 during the pivotal movement of the first manual lever 13 on the first support shaft 12. The first turning radius R1 is defined as a distance between the first support shaft 12 and the output portion 26 of the first manual lever 13. The input portion 44 of the second manual lever 14 moves in a curve or arc of a second radius (second turning radius) R2 during the pivotal movement of the second manual lever 14 on the second support shaft 14. The second turning radius R2 is defined as a distance between the second support shaft 14 and the input portion 44. The first turning radius R1 is larger than the second turning radius R2. With the first turning radius R1 larger than the second turning radius R2, a small amount of pivotal movement of the first manual lever 13 can causes a large amount of pivotal movement of the second manual lever 15. Therefore, when the first manual lever 13 pivots counterclockwise through a small angle, the second manual lever 14 pivots through an angle which is so large that the input portion 44 moves away from the output portion 26 of the first manual lever 13 so as to allow the first manual lever 13 to pivot independently of the second manual lever 15. That is, the first manual lever 13 can be operated independently of the second manual lever 14 in a short time after the first manual lever 13 is pivoted counterclockwise from the position shown in FIG. 6, which provides improved operability of the first manual lever 13.

Figure 9:
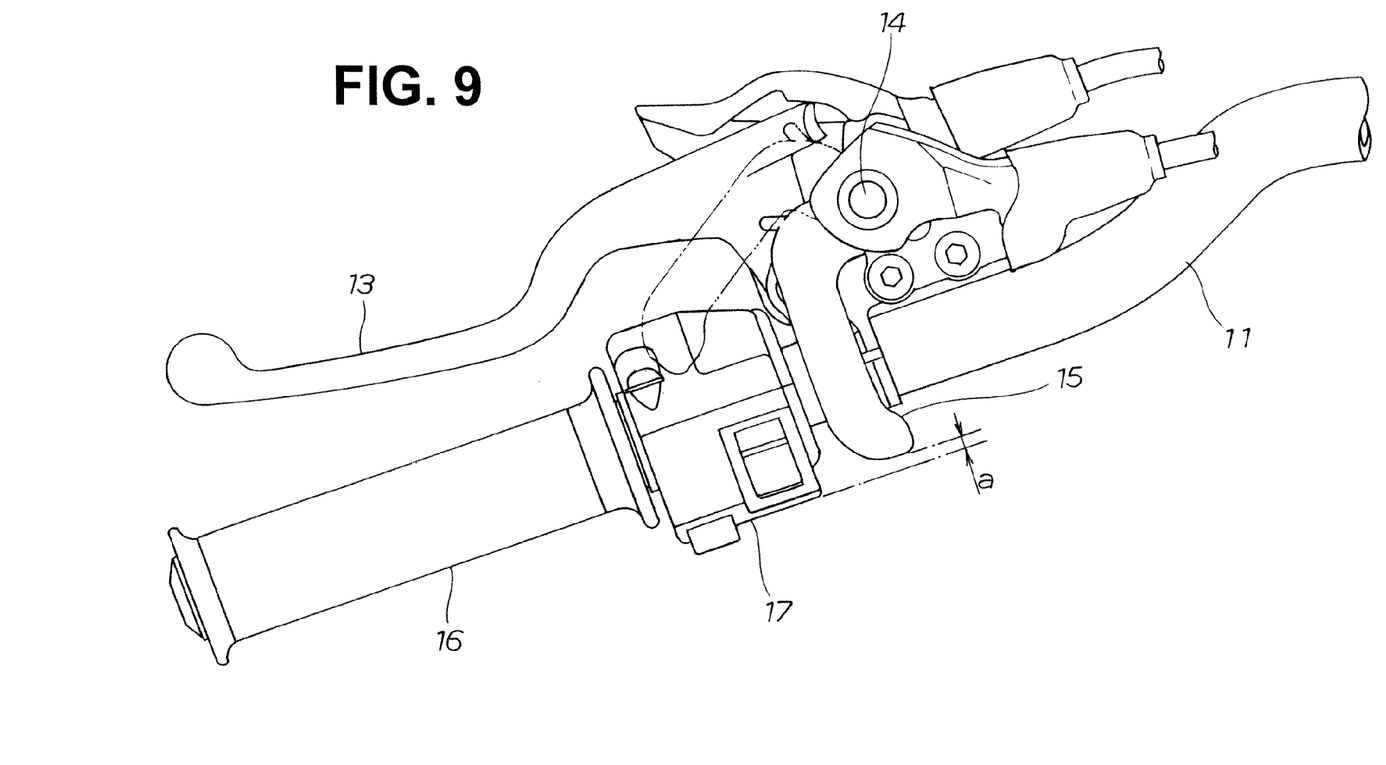
FIG. 9 is a view showing an alternative to the second manual operation member shown in FIG. 7.

FIG. 9 shows a manually operable mechanism according to another embodiment of the present invention. The manually operable mechanism includes the second manual lever 15 having a distal end at a position located forward of a rear face of the left switch box 17 when the second manual lever 15 is pivoted to a position where the second manual lever 15 is directed perpendicularly to the handlebar 11, as shown in FIG. 9. That is, the distal end of the second manual lever 15 directed perpendicularly to the handlebar 11 is forward offset by a distance "a" from the level of the rear face of the left switch box 17. The distance "a" can be easily set by devising the configuration of the second manual lever 15 and the location of the second support shaft 14. Even if an object is flown from a rear side of the handlebar 11 towards the second manual lever 15, the object hits against the switch box 17 without interfering with the second manual lever 15.

The second manual lever 17 may be provided on a right grip of the handlebar 11. The vehicle 10 may be a three-wheeled or four-wheeled one employing the handlebar.

Although the first manual operation member and the second manual operation member have been described as being applied to the manual levers 13, 15, the first and second manual operation members may be of dial-type.

INDUSTRIAL APPLICABILITY

The manually operable mechanism for a parking brake, according to the present invention is suitable for use in a motorcycle.

LEGEND

10—manually operable mechanism; 11—handlebar; 12—first support shaft; 13—first manual operation member; 14—second support shaft second manual operation member; 20—support member; 26—output portion; 44—input portion; 54—front edge of first manual operation member; 55—rear edge of handlebar

The invention claimed is:

1. A manually operable mechanism for a vehicle having a handlebar to be operated by an operator for steering the vehicle, comprising:
   a first manual operation member pivotably attached to the handlebar through a first support shaft, the first manual operation member being operable by the operator to pivot on the first support shaft;
   a second manual operation member pivotably attached to the handlebar through a second support shaft disposed adjacent and in parallel to the first support shaft; and
   the first manual operation member having an output portion, the second manual operation member having an input portion configured to be pressed by the output portion of the first operation member during pivotal movement of the first manual operation member on the first support shaft such that the second manual operation member pivots on the second support shaft,
   wherein the second manual operation member is pivotable between an operated position and a non-operated position, and wherein, when the second manual operation member is in the operated position, the second manual operation member is urged by a predetermined urging force in a direction opposite to a direction toward the non-operated position, and when the second manual operation member pivots towards the non-operated position through a given angle, the second manual operation member is urged by the urging force in the direction toward the non-operated position, and wherein when the first manual operation member is pivoted in a counterclockwise direction, the second manual operation member is pivoted in the same counterclockwise direction, from the operated position to the non-operated position.

2. The mechanism of claim 1, wherein the first manual operation member, the second manual operation member and the second support shaft are disposed such that, when the first manual operation member pivots against the urging force through an angle smaller than a predetermined angle, the second manual operation member is pivoted by the output portion of the first manual operation member pressing the input portion of the second manual operation member, and when the first manual operation member pivots through an angle larger than the predetermined angle, the second manual operation member is pivoted by the urging force urging the second manual operation member in the direction toward the non-operated position and the input portion of the second manual operation member is configured to move away from the output portion of the first manual operation member so as to allow the second manual operation member to pivot independently of the first manual operation member.

3. The mechanism of claim 1, wherein the second manual operation member is used for operating a parking brake to hold the vehicle in a parked state.

4. The mechanism of claim 1, wherein the first manual operation member, the first support shaft and the second support shaft are disposed forward of the handlebar when the vehicle is viewed in top plan, and wherein, when a parking brake is released, the second manual operation member is located rearward of a front edge of the first manual operation member and forward of a rear edge of the handlebar in such a manner that a distal end of the second manual operation member does not interfere with a range of movement of an operational portion of the first manual operation member.

5. The mechanism of claim 1, wherein the second manual operation member is pivotable between the operated position to apply a parking brake and the non-operated position to release the parking brake, and wherein the output portion of the first manual operation member and the input portion of the second manual operation member are disposed in such a manner as to prevent the second manual operation member from pivoting to the operated position when the first manual operation member is operated by a maximum amount.

6. The mechanism of claim 1, wherein the output portion of the first manual operation member provides a first turning radius defined as a distance between the output portion and the first support shaft, and the input portion of the second manual operation member provides a second turning radius defined as a distance between the input portion and the second support shaft, the first radius being larger than the second radius.

7. The mechanism of claim 6, wherein the second support shaft is disposed adjacent to a center of a straight line passing over the output portion and the first support shaft.

8. The mechanism of claim 1, wherein the second manual operation member is disposed in such a manner as to pivot on the second support shaft within a range that does not extend rearward beyond a rear face of an auxiliary member attached to the handlebar when the vehicle is viewed in top plan.

9. The mechanism of claim 1, further comprising:
an end member attached to a cable,
wherein the end member is attached to the second manual operation member offset from the second support shaft,
wherein the end member and cable are configured to provide the urging force.

* * * * *